US012646912B2

(12) United States Patent
Kao

(10) Patent No.: US 12,646,912 B2
(45) Date of Patent: Jun. 2, 2026

(54) WIRE STRIPPER

(71) Applicant: JETOOL CORP., New Taipei City (TW)

(72) Inventor: Yi Ching Kao, New Taipei City (TW)

(73) Assignee: JETOOL CORP., New Taipei City (TW)

( * ) Notice: Subject to any disclaimer, the term of this patent is extended or adjusted under 35 U.S.C. 154(b) by 108 days.

(21) Appl. No.: 18/931,063

(22) Filed: Oct. 30, 2024

(65) Prior Publication Data

US 2025/0385495 A1 Dec. 18, 2025

(30) Foreign Application Priority Data

Jun. 18, 2024 (TW) ................................ 113122505

(51) Int. Cl.
H02G 1/12 (2006.01)
(52) U.S. Cl.
CPC ................................. H02G 1/1214 (2013.01)
(58) Field of Classification Search
CPC ...... H02G 1/1214; H02G 1/12; H02G 1/1202; H02G 1/1204; H02G 1/1207; H02G 1/1209; H02G 1/1212; H02G 1/1241
USPC ................ 30/90.1, 90.2, 329, 330, 337, 340
See application file for complete search history.

(56) References Cited

U.S. PATENT DOCUMENTS

| | | | | |
|---|---|---|---|---|
| 4,226,145 A | 10/1980 | Gill | | |
| 6,718,638 B2 * | 4/2004 | Liaw | ................... | H02G 1/1224 30/90.1 |
| 8,904,647 B2 * | 12/2014 | Steiner | ................. | H02G 1/1224 30/91.2 |
| 2007/0067996 A1 * | 3/2007 | Chang | ................. | H02G 1/1229 30/90.1 |
| 2011/0072593 A1 * | 3/2011 | Battenfeld | ......... | H01R 43/0421 30/90.1 |
| 2016/0103291 A1 * | 4/2016 | Santos | ................. | G02B 6/4497 30/91.2 |

FOREIGN PATENT DOCUMENTS

| | | |
|---|---|---|
| CN | 204793883 | 11/2015 |
| CN | 108565789 | 9/2018 |
| CN | 108988225 | 12/2018 |
| CN | 116093837 | 5/2023 |
| TW | M361165 | 7/2009 |

OTHER PUBLICATIONS

"Office Action of Taiwan Counterpart Application", issued on Jul. 10, 2025, p. 1-p. 4.

* cited by examiner

*Primary Examiner* — Phong H Nguyen
(74) *Attorney, Agent, or Firm* — JCIPRNET

(57) ABSTRACT

A wire stripper includes a first handle, a second handle pivotally connected to the first handle, a first cutter disposed on the first handle, and a protective cover movably connected to the first handle. The first cutter moves to a cutting platform of the second handle or away from the cutting platform as the first handle and the second handle pivotally rotate with respect to each other. The protective cover covers at least a portion of the first cutter. When the first cutter moves to the cutting platform to cut a cable, the protective cover is adapted to be pushed by the cable and move with respect to the first handle to expose a portion of the first cutter for cutting the cable.

9 Claims, 9 Drawing Sheets

$151 \begin{cases} 151a \\ 151b \end{cases}$    $152 \begin{cases} 152a \\ 152b \end{cases}$

WIRE STRIPPER

CROSS-REFERENCE TO RELATED APPLICATION

This application claims the priority benefit of Taiwan application serial no. 113122505, filed on Jun. 18, 2024. The entirety of the above-mentioned patent application is hereby incorporated by reference herein and made a part of this specification.

BACKGROUND

Technical Field

The disclosure relates to a hand tool, and particularly relates to a wire stripper.

Description of Related Art

At present, various signal wires and signal connectors have been widely used in signal transmission. For example, network cables and RJ45 connectors, coaxial cables, and coaxial terminals are used for transmitting network and video signals, and telephone lines and RJ11 connectors are used for transmitting telephone signals, etc. In order to connect the wire to the required equipment, the terminal of the wire is usually connected to the corresponding connector to form a cable connector. In this case, a specific wire crimping tool needs to be used to connect the wire and the connector to each other.

Before the cable is combined with the connector, the cable is often processed in advance. For example, the cable is cut or stripped to a state that is sufficient to be crimped together with the connector. Therefore, the operator often needs to use different tools to achieve the requirements of the aforementioned cable. Generally speaking, most of these tools have cutting blades that are exposed, so the operator faces the risk of being injured due to accidental contact when carrying the tools or working.

SUMMARY

The disclosure provides a wire stripper, which has a movable protective cover to protect the operator.

A wire stripper of the disclosure includes a first handle, a second handle, a first cutter, and a protective cover. The second handle is pivotally connected to the first handle. The first cutter is disposed on the first handle, and moves to a cutting platform of the second handle or away from the cutting platform as the first handle and the second handle pivotally rotate with respect to each other. The protective cover is movably connected to the first handle and covers at least a portion of the first cutter. When the first cutter is away from the cutting platform, the protective cover completely covers the first cutter. When the first cutter moves to the cutting platform, the protective cover covers a portion of the first cutter, and a side edge of the protective cover and the cutting platform form a slot, so that another portion of the first cutter is exposed from the slot.

Based on the above, since the protective cover is movably connected to the first handle and located next to the first cutter to cover the first cutter, a barrier structure can be provided for the operator to prevent the operator from directly contacting the first cutter, thereby providing a protective effect. Furthermore, when cutting a cable, the movable protective cover can be pushed by the cable to expose a portion of the first cutter, and since the protective cover is still supported on the cable, the exposed portion is used for cutting the cable. In other words, the first cutter at this time is in a state of being covered by the protective cover and the cable, so that the wire stripper can have both the cutting function and the protective effect.

DESCRIPTION OF THE EMBODIMENTS

Figure 1:
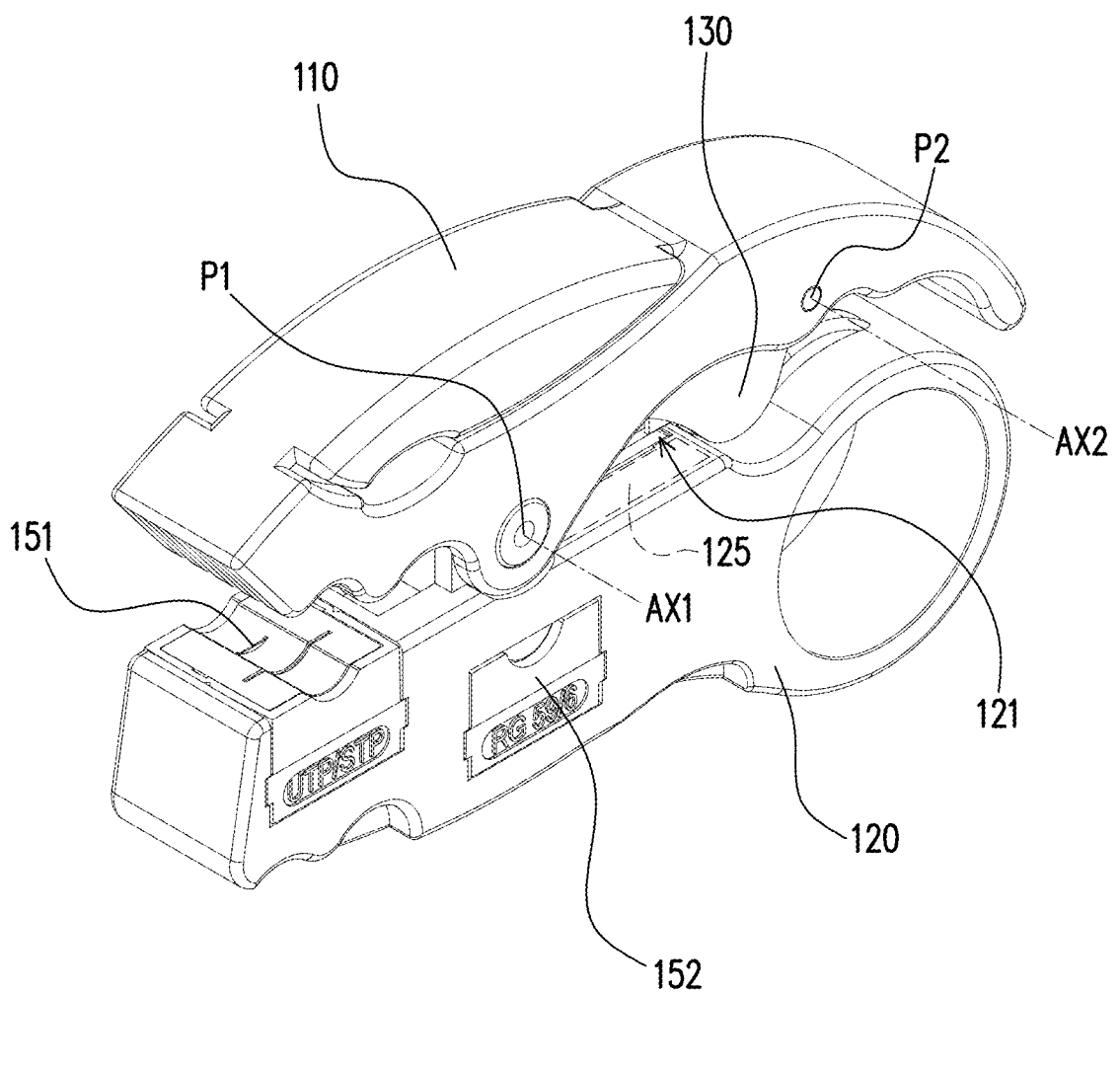
FIG. 1 is a schematic view of a wire stripper according to an embodiment of the disclosure.
Figure 2A:
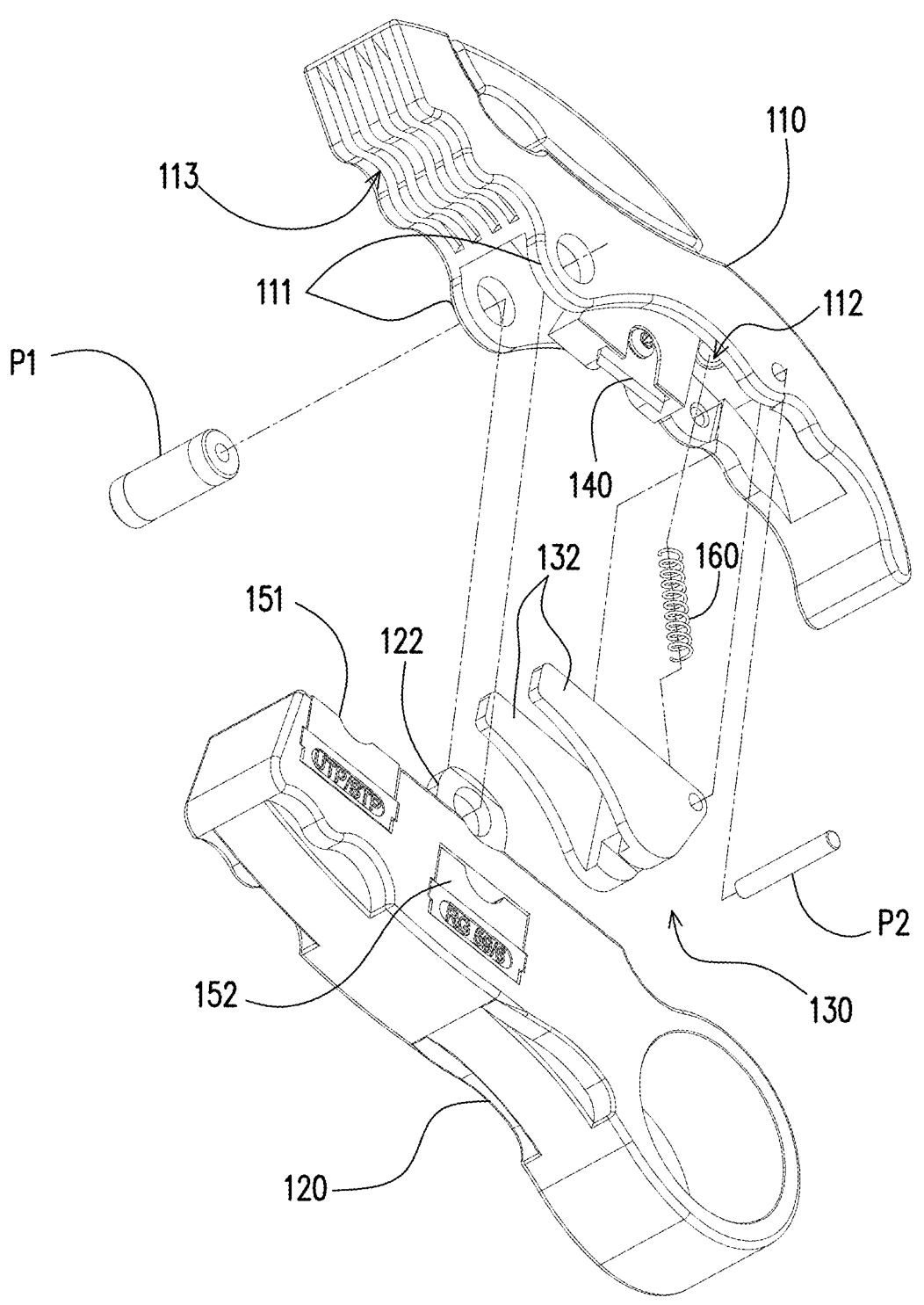
FIG. 2A and FIG. 2B are exploded views of the wire stripper in FIG. 1 from different viewing angles.
Figure 2B:
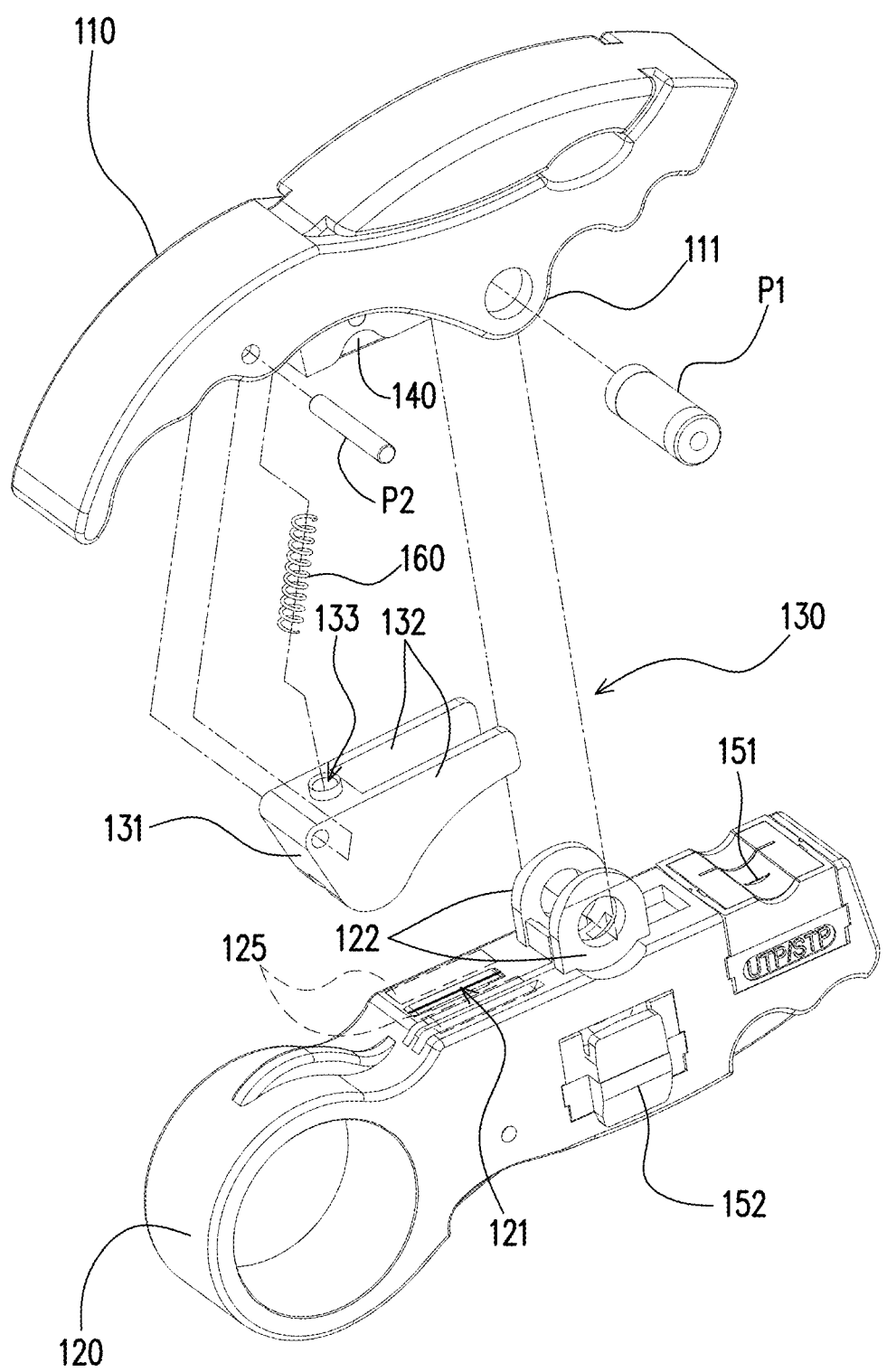

FIG. 1 is a schematic view of a wire stripper according to an embodiment of the disclosure FIG. 2A and FIG. 2B are exploded views of the wire stripper in FIG. 1 from different viewing angles. Referring to FIG. 1, FIG. 2A, and FIG. 2B at the same time, in the embodiment, a wire stripper 100 includes a first handle 110, a second handle 120, a first cutter 140, and a protective cover 130. The second handle 120 is pivotally connected to the first handle 110 through a first pivot P1, so that the first handle 110 and the second handle 120 pivotally rotate with respect to each other along a first axial direction AX1 through the first pivot P1. As shown in FIG. 2A and FIG. 2B, the first pivot P1 passes through pivoting portions 111 and 122 to complete the pivoting relationship. The first cutter 140 is disposed on the first handle 110, and moves to a cutting platform 121 of the second handle 120 or away from the cutting platform 121 as the first handle 110 and the second handle 120 pivotally rotate with respect to each other.

The protective cover 130 is pivotally connected to the first handle 110 through a second pivot P2 and covers at least a portion of the first cutter 140, so that the protective cover 130 may pivotally rotate with respect to the first handle 110 along a second axial direction AX2 through the second pivot P2. Here, the first cutter 140 and the protective cover 130 are respectively located between the first pivot P1 and the second pivot P2, and the first pivot P1 (first axial direction AX1) is parallel to the second pivot P2 (second axial direction AX2).

It can be seen from FIG. 2A and FIG. 2B that the protective cover 130 covers the first cutter 140 along a lateral direction. The lateral direction is parallel to or consistent with a pivoting axial direction of the first handle 110 and the second handle 120 (the first axial direction AX1, marked in FIG. 1) and the pivoting axial direction of the protective cover 130 and the first handle 110 (the second axial direction AX2, marked in FIG. 1). Furthermore, the protective cover 130 of the embodiment includes a base 131 and two side plates 132 extending from two opposite sides of the base 131. The base 131 is pivotally connected to the first handle 110 through second pivot P2, and the first cutter 140 is substantially located between the two side plates 132. In another embodiment not shown, an elliptical slot hole can also be used between the protective cover 130 and the first handle 110, so that the protective cover 130 exhibits a pivoting and sliding movement mode with respect to the first handle 110.

Furthermore, the wire stripper further includes a spring 160 abutting between the first handle 110 and the protective cover 130. The spring 160 constantly drives the protective cover 130 to move toward a position that completely covers the first cutter 140. In the embodiment, one end of the spring 160 is received in a first receiving hole 112 of the first handle 110, and the other end of the spring 160 is received in a second receiving hole 133 of the base 131. Different from the spring 160 shown in the embodiment, which is a compression spring, in another embodiment of the disclosure not shown, the spring can also be changed to a torsion spring, which is sleeved on the second pivot P2 with its two opposite ends respectively abutting against the first handle 110 and the protective cover 130, such that the protective cover 130 is in a state of covering the first cutter 140 when no external force is applied.

Figure 3:
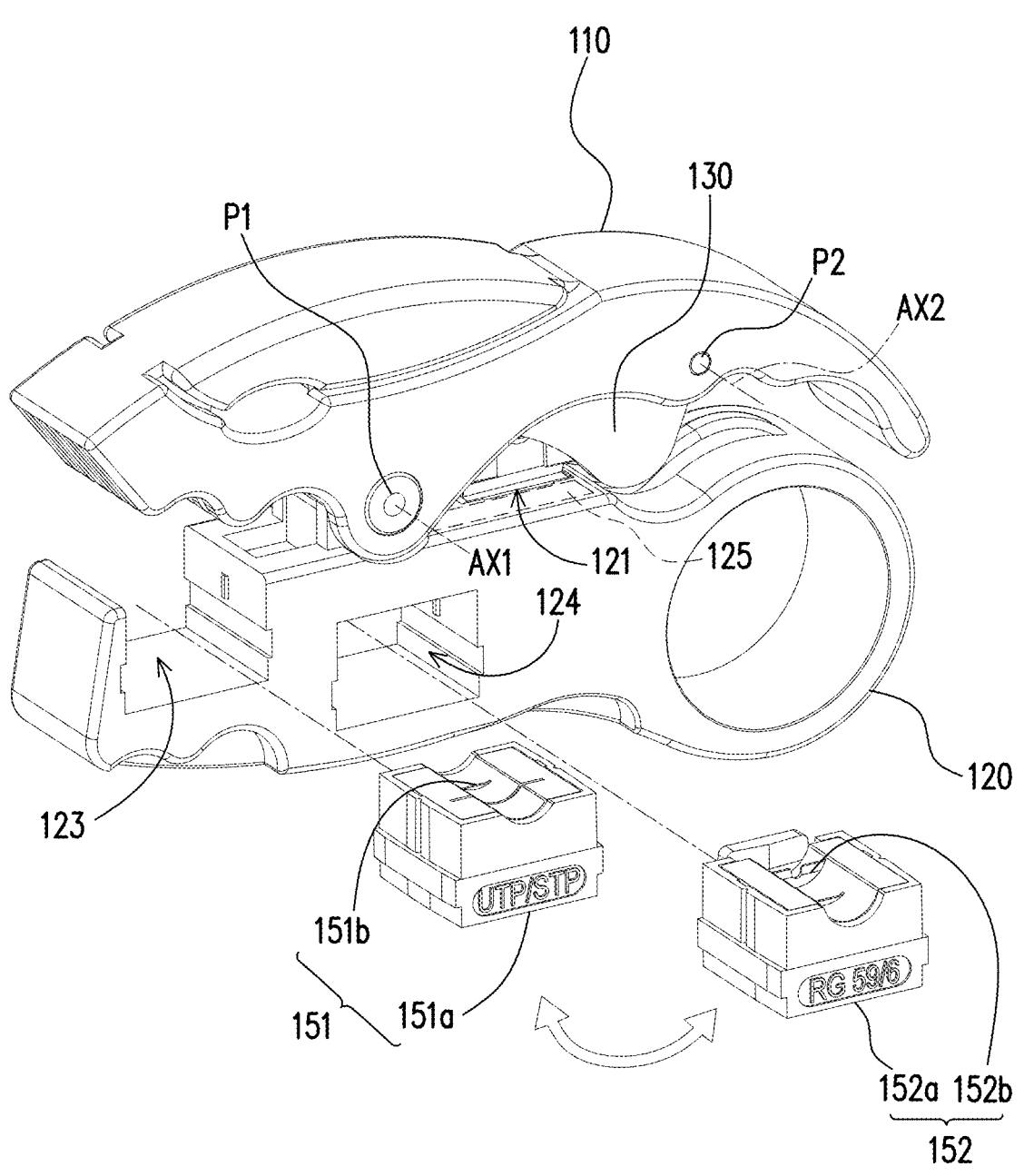
FIG. 3 is a schematic exploded view of a part of components of the wire stripper in FIG. 1.

In addition, FIG. 3 is a schematic exploded view of a part of components of the wire stripper in FIG. 1. Referring to FIG. 3, the wire stripper 100 of the embodiment also includes a second cutter 151 detachably disposed on the second handle 120. The first pivot P1 is located between the first cutter 140 and the second cutter 151. Furthermore, the wire stripper 100 further includes a third cutter 152 detachably disposed on the second handle 120. Here, the second cutter 151 has a carrier 151*a* and a blade 151*b*, and the third cutter 152 has a carrier 152*a* and a blade 152*b*. The structures of the carriers 151*a* and 152*a* are the same as each other, but the types of the blades 151*b* and 152*b* are different from each other. Accordingly, the structure of the second handle 120 configured to clamp the second cutter 151 (for example, a bearing slot 123) is consistent with the structure configured to clamp the third cutter 152 (for example, a bearing slot 124), such that the second cutter 151 and the third cutter 152 can be exchanged by the user.

Figure 4A:
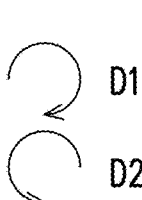
FIG. 4A to FIG. 4C are different states of a wire stripper from a side view.
Figure 4A:
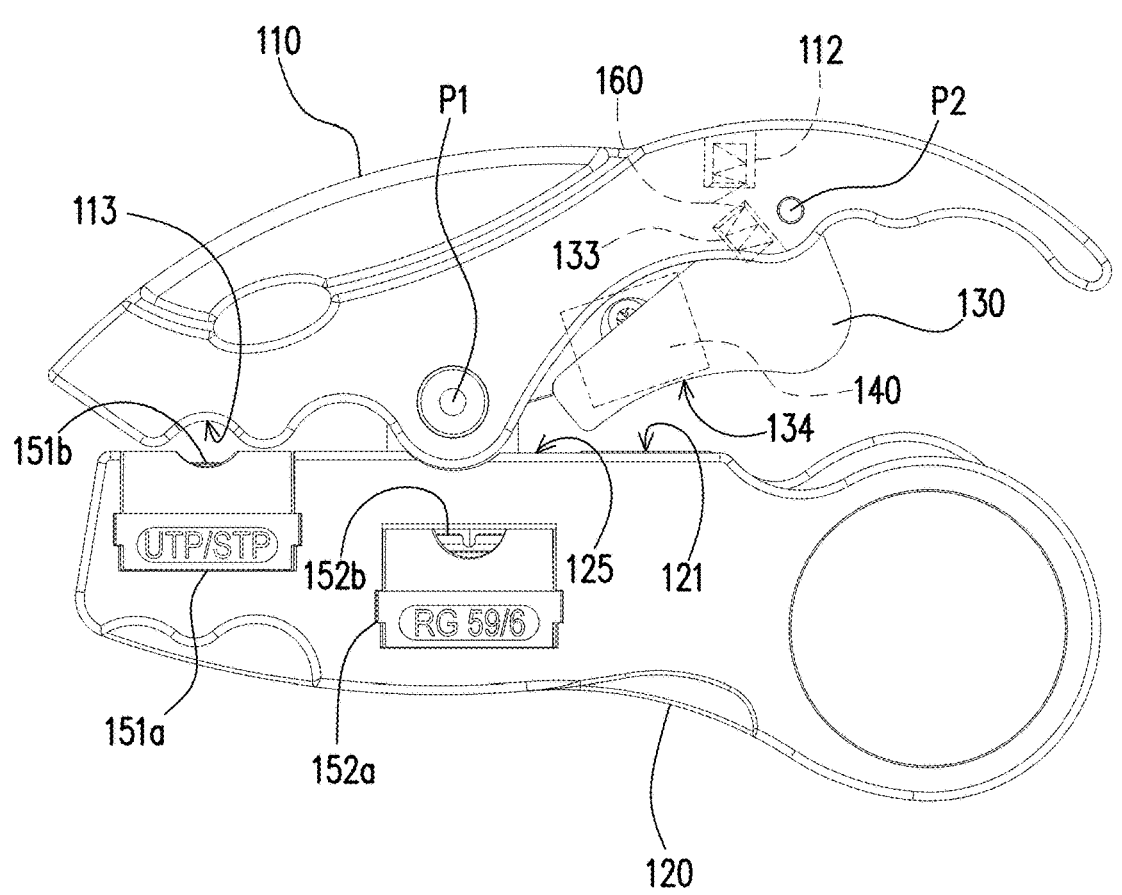
Figure 4B:
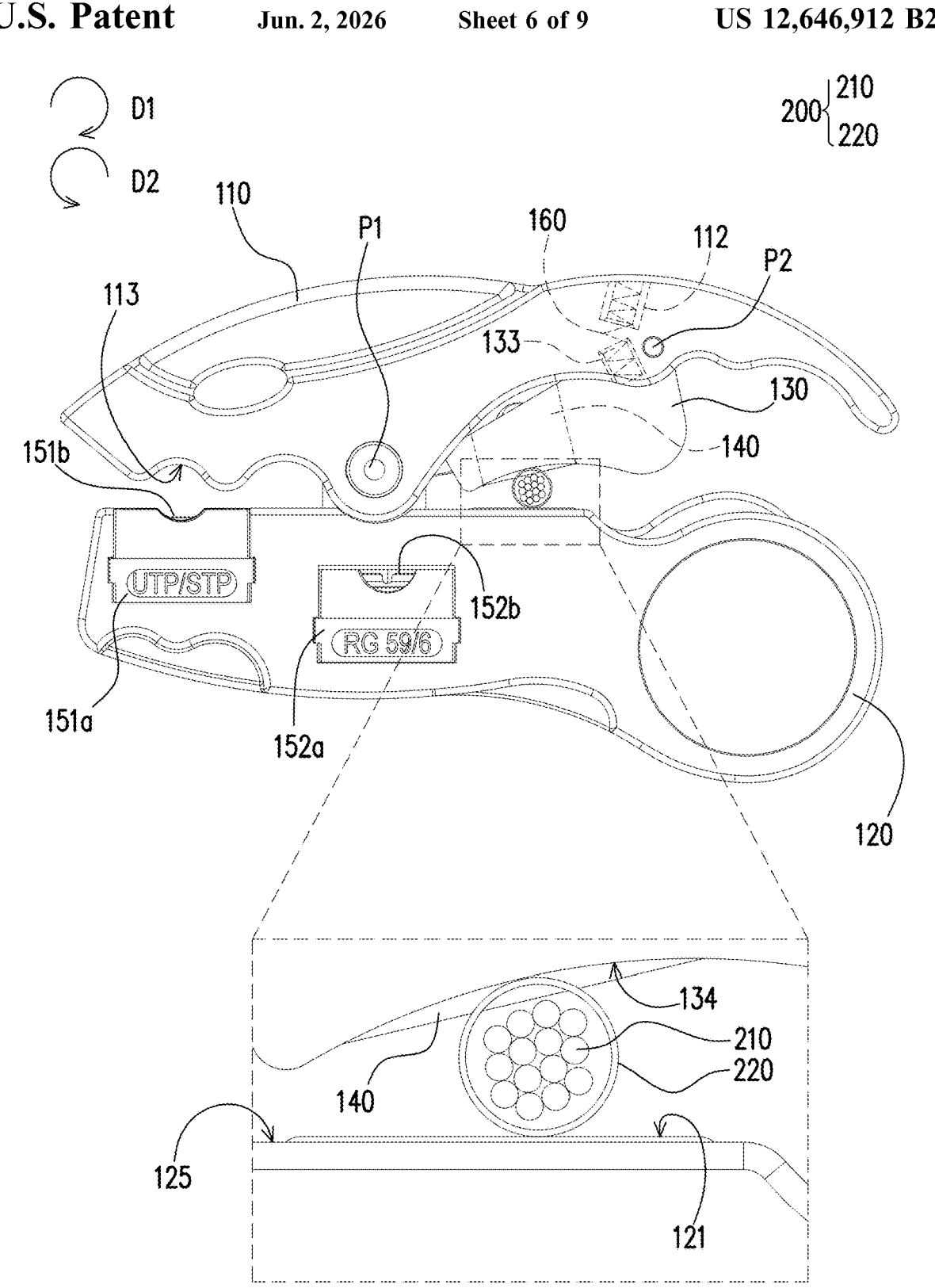
Figure 4C:
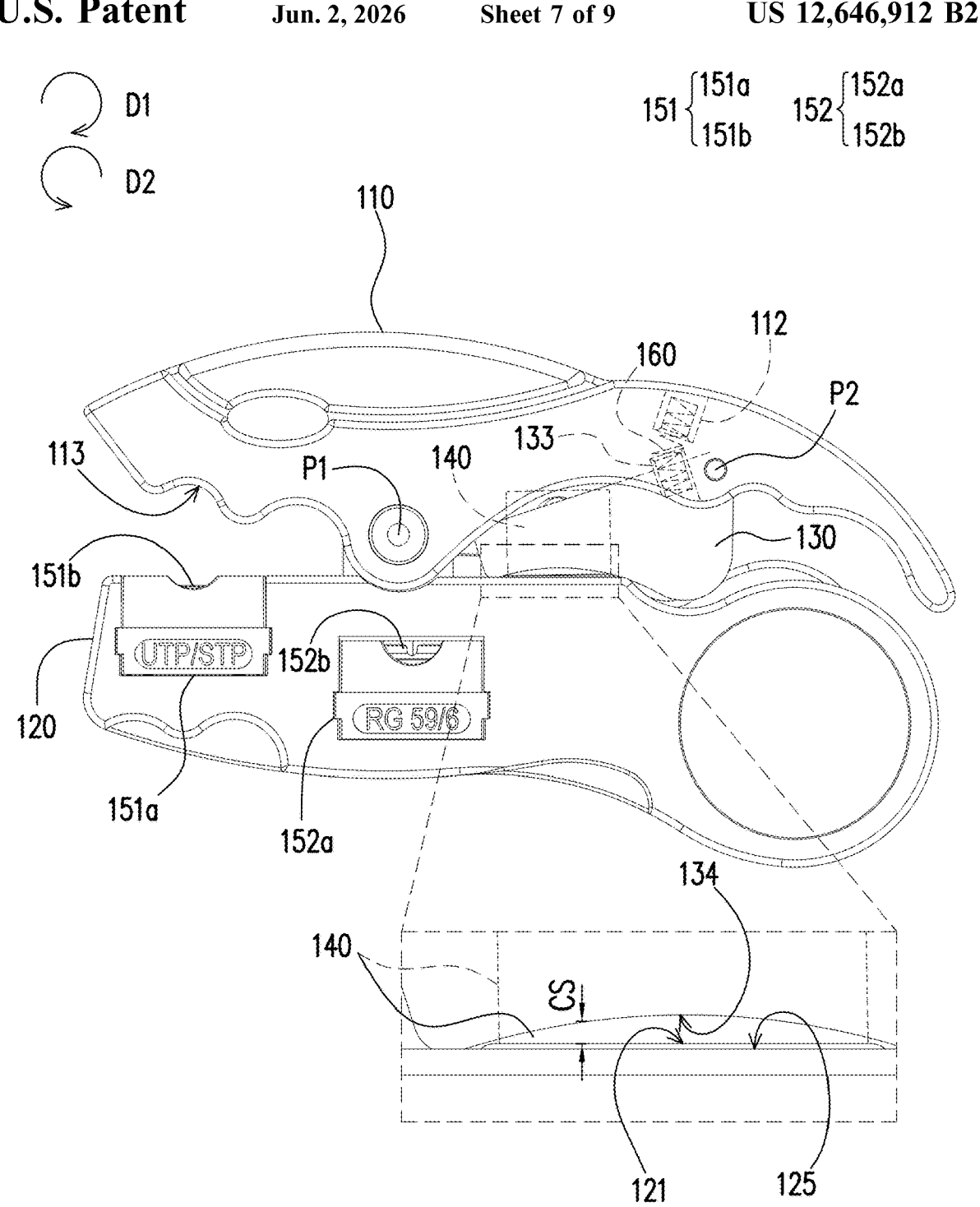

FIG. 4A to FIG. 4C are different states of a wire stripper from a side view, where FIG. 4B is used to illustrate the state of the wire stripper 100 cutting a cable 200. Referring to FIG. 4A to FIG. 4C at the same time, and comparing with the first axial direction AX1 and the second axial direction AX2 shown in FIG. 1, in the embodiment, since the first pivot P1 is located between the first cutter 140 and the second cutter 151, when the first handle 110 rotates along a first direction D1, that is, the process of FIG. 4A to FIG. 4B, the first cutter 140 moves to the cutting platform 121, and a supporting portion 113 of the first handle 110 moves away from the second cutter 151. On the contrary, when the first handle 110 rotates along a second direction D2, the supporting portion 113 of the first handle 110 will move to the second cutter 151, and the first cutter 140 will move away from the cutting platform 121. The first direction D1 and the second direction D2 are opposite to each other.

Furthermore, as shown in FIG. 4A, when the first cutter 140 is away from the cutting platform 121, due to the action of the spring 160, it will drive the protective cover 130 to completely cover the first cutter 140. That is, the two side plates 132 of the protective cover 130 (as shown in FIG. 2A and FIG. 2B) will completely fall on a lateral direction of the first cutter 140. As shown in FIG. 4B, when cutting the cable 200 with the first cutter 140 of the wire stripper 100, the movable protective cover 130 will be pushed by the cable 200, so that a portion of the first cutter 140 is exposed. Then as shown in FIG. 4B, the first cutter 140 with an exposed side edge 134 can cut into the cable 200. As shown in FIG.

4B, the first cutter 140 cuts into an outer covering 220 of the cable 200 but has not yet cut into a core 210.

In addition, as shown in FIG. 1, FIG. 2B, or FIG. 4C, the second handle 120 also has a pair of pushing platforms 125 located on two opposite sides of the cutting platform 121, that is, the structural areas of the second handle 120 on two opposite sides of the cutting platform 121 are configured to correspond to the two side plates 132 of the protective cover 130. When the first cutter 140 moves to the cutting platform 121, the protective cover 130 (the side plate 132) will abut against the pushing platform 125 and be pushed by the pushing platform 125, so that after rotating in the first direction D1 and compressing the spring 160, the protective cover 130 is converted to cover a portion of the first cutter 140. At this time, the side edge 134 of the protective cover 130 and the cutting platform 121 form a slot CS, so that another portion of the first cutter 140 is exposed from the slot CS. Simply put, when the cable (not shown) is placed on the cutting platform 121 and cut as shown in FIG. 4B, since the protective cover 130 will be pushed by the cable and rotate in the first direction D1 as mentioned above (and compress the spring 160), the cable can still be cut while being protected by the protective cover 130.

Figure 5A:
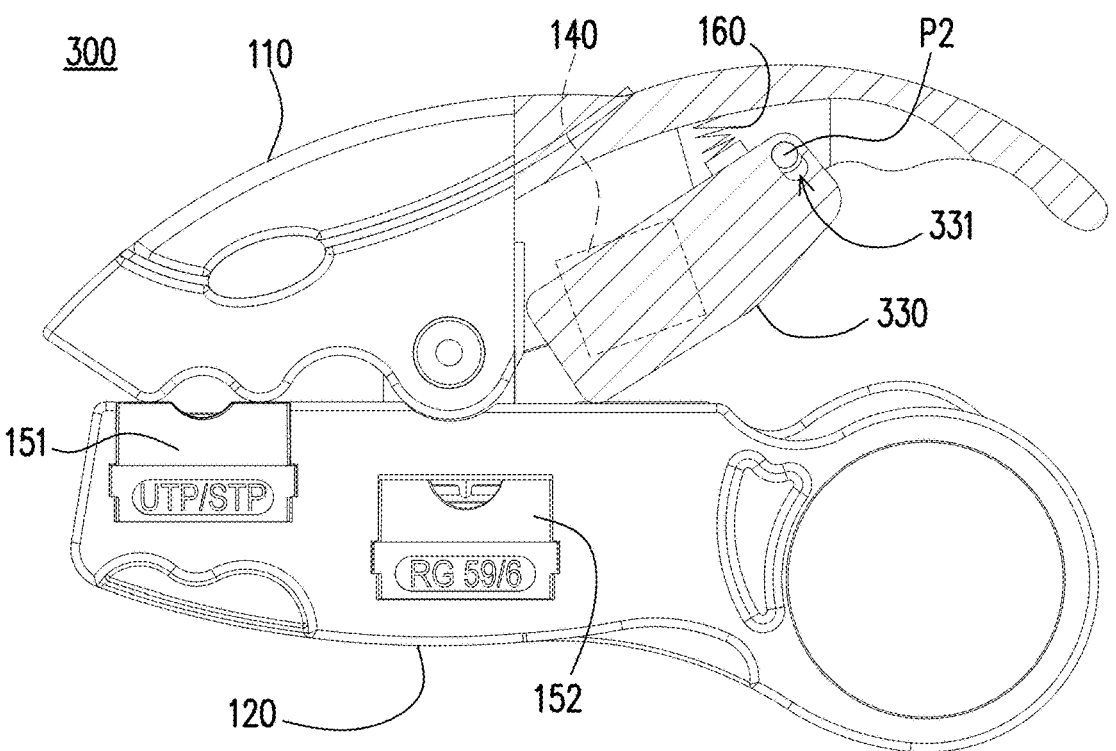
FIG. 5A to FIG. 5C are a wire stripper according to another embodiment of the disclosure.
Figure 5B:
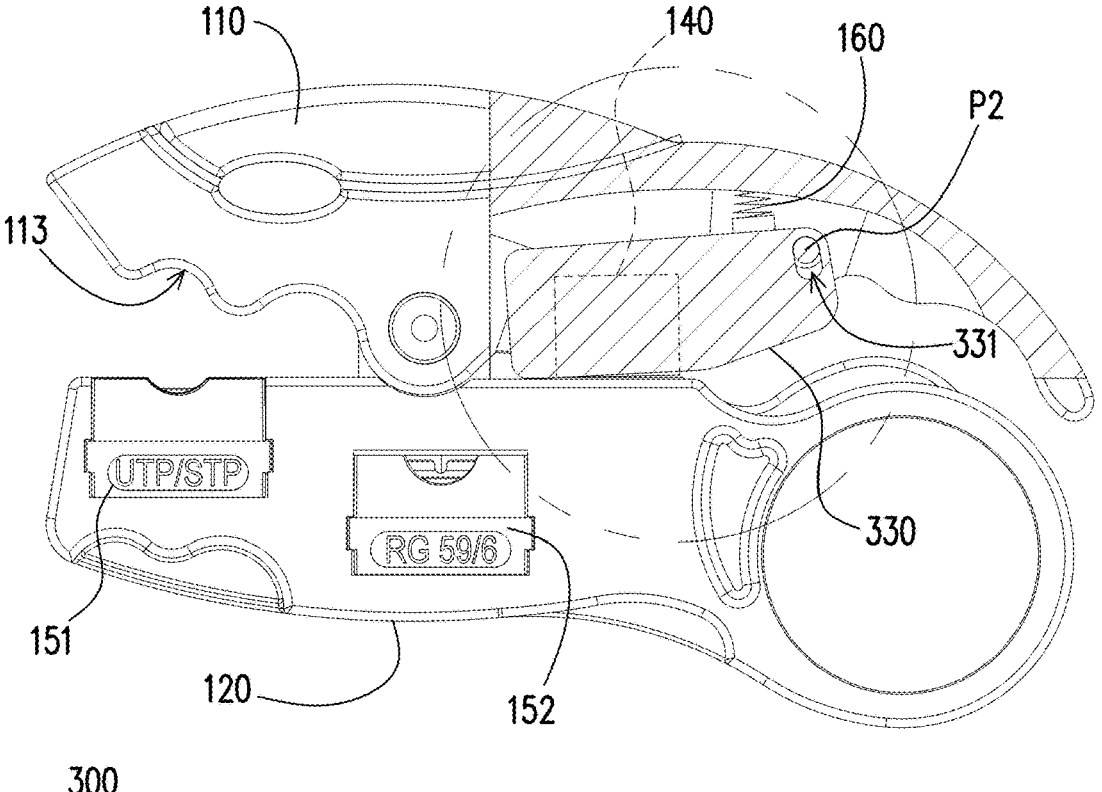
Figure 5C:
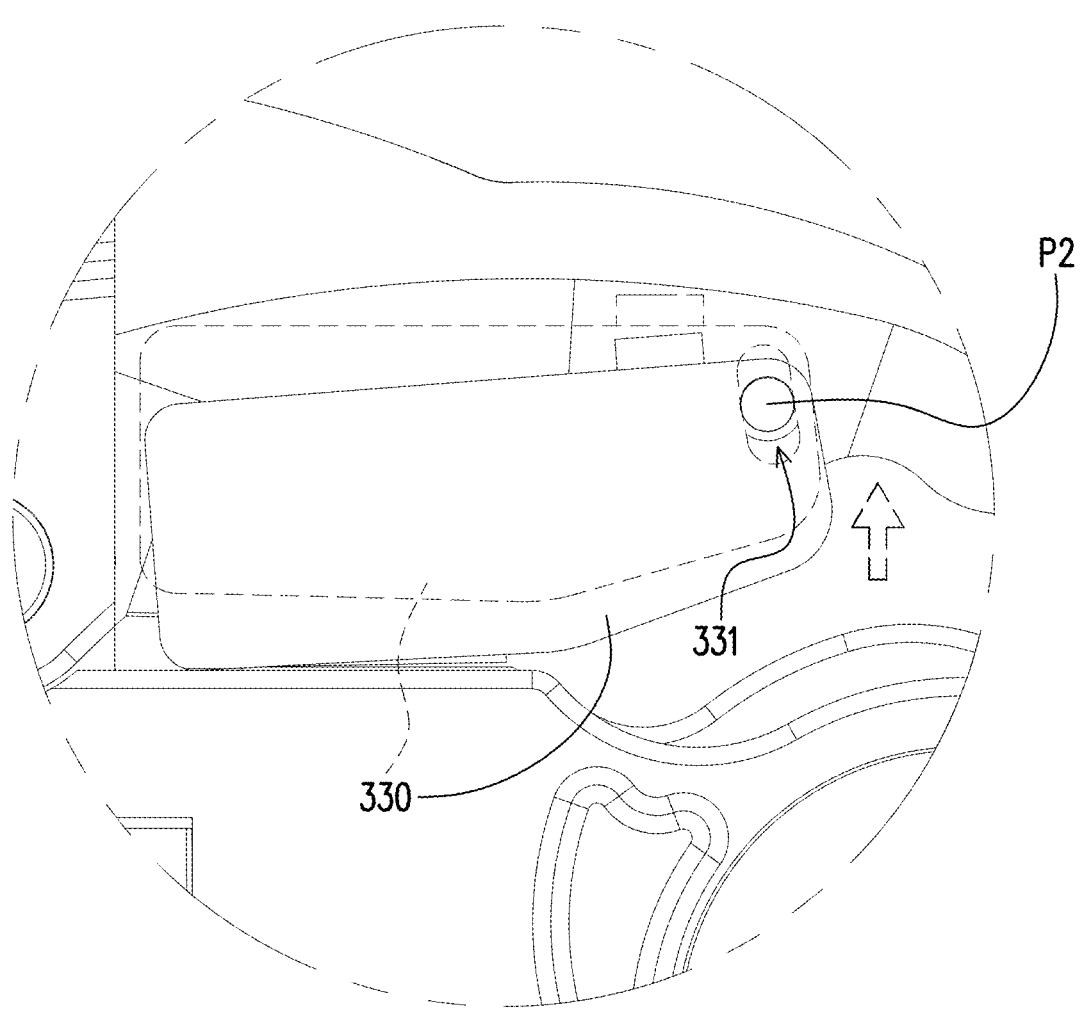

FIG. 5A to FIG. 5C are a wire stripper according to another embodiment of the disclosure. FIG. 5A and FIG. 5B respectively illustrate a partial cross-sectional structure of the wire stripper, and FIG. 5C is a partial enlargement of FIG. 5B, and the cross-section line in FIG. 5B is omitted to facilitate identification of component changes. Referring to FIG. 5A to FIG. 5C at the same time, in a wire stripper 300 of the embodiment, the same components as those in the previous embodiment are denoted by the same referential numerals, and descriptions of their features are omitted. Different from the previous embodiment, a protective cover 330 of the embodiment has an elliptical slot hole 331, and the second pivot P2 is pivotably and slidably coupled in the elliptical slot hole 331. In this way, the protective cover 330 of the embodiment has a better movable dimension, that is, in addition to being able to pivotally rotate with respect to the first handle 110, there is also excess margin to move relatively closer to or away from the first handle 110, so as to provide a mechanism limiting effect.

As shown in FIG. 5C, due to the return action of the spring 160, in addition to allowing the protective cover 330 to pivotally rotate, once the reaction force when encountering the second handle 120 is too large, the protective cover 330 can also move reversely due to the existence of the elliptical slot hole 331, so as to release the possibility of the aforementioned force, as shown in the dotted arrow in FIG. 5C. On the other hand, if it only has a pivotal rotation dimension, when the driving force of the spring 160 is too large, it is easy to cause the mechanism to lock or even cause damage to the protective cover (or surrounding components).

In summary, in the above embodiments of the disclosure, since the protective cover is movably connected to the first handle and located next to the first cutter to cover the first cutter, a barrier structure can be provided for the operator to prevent the operator from directly contacting the first cutter, thereby providing a protective effect. Furthermore, when cutting a cable, the movable protective cover can be pushed by the cable to expose a portion of the first cutter, and since the protective cover is still supported on the cable, the exposed portion is used for cutting the cable. In other words, the first cutter at this time is in a state of being covered by the protective cover and the cable, so that the wire stripper can have both the cutting function and the protective effect.

What is claimed is:

1. A wire stripper, comprising:
a first handle;
a second handle, pivotally connected to the first handle;
a first cutter, disposed on the first handle, and configured to move to a cutting platform of the second handle or away from the cutting platform as the first handle and the second handle pivotally rotate with respect to each other;
a protective cover, movably connected to the first handle, and covering the first cutter, wherein when the first cutter moves toward the cutting platform to cut a cable, the protective cover is adapted to be pushed by the cable and move with respect to the first handle to expose a portion of the first cutter for cutting the cable, wherein the protective cover comprises a base and two side plates extending from two opposite sides of the base, the base is pivotally connected to the first handle, and the first cutter is located between the two side plates; and
a spring, wherein one end of the spring is received in a first receiving hole of the first handle, and the other end of the spring is received in a second receiving hole of the base.

2. The wire stripper according to claim 1, further comprising a first pivot and a second pivot, wherein the first pivot connects the first handle and the second handle, the second pivot connects the first handle and the protective cover, and the first cutter is located between the first pivot and the second pivot.

3. The wire stripper according to claim 2, wherein the first pivot is parallel to the second pivot.

4. The wire stripper according to claim 2, further comprising a second cutter detachably disposed on the second handle, wherein the first pivot is located between the first cutter and the second cutter, the first handle rotates in a first direction, so that the first cutter moves to the cutting platform, and a supporting portion of the first handle moves away from the second cutter, the first handle rotates in a second direction, so that the supporting portion of the first handle moves to the second cutter, and the first cutter moves away from the cutting platform, and the first direction and the second direction are opposite to each other.

5. The wire stripper according to claim 4, further comprising a third cutter detachably disposed on the second handle, wherein a structure of the second handle configured to clamp the second cutter is consistent with a structure configured to clamp the third cutter, so that the second cutter and the third cutter can be exchanged by the user.

6. The wire stripper according to claim 1, wherein the protective cover covers the first cutter along a lateral direction, and the lateral direction is parallel to or consistent with a pivoting axial direction of the first handle and the second handle and a pivoting axial direction of the protective cover and the first handle.

7. The wire stripper according to claim 1, wherein the spring abuts between the first handle and the protective cover, and the spring constantly drives the protective cover to move toward a position that completely covers the first cutter.

8. The wire stripper according to claim 7, wherein the second handle also has a pushing platform located on two opposite sides of the cutting platform, and when the first cutter moves to the cutting platform, the protective cover is pushed by the pushing platform to compress the spring.

9. The wire stripper according to claim 1, wherein when the first cutter moves away from the cutting platform, the protective cover completely covers the first cutter, when the first cutter moves to the cutting platform, the protective cover covers a portion of the first cutter, and a side edge of the protective cover and the cutting platform form a slot, so that another portion of the first cutter is exposed from the slot.

* * * * *